Figure 3:
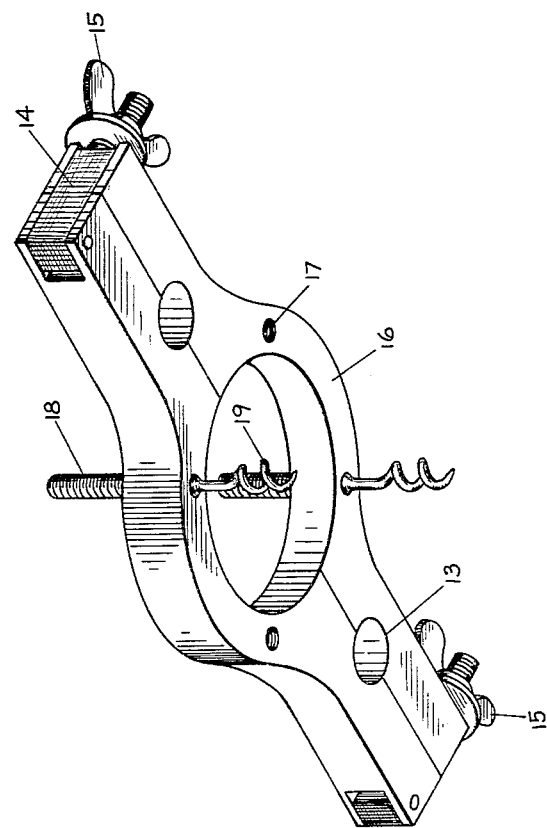

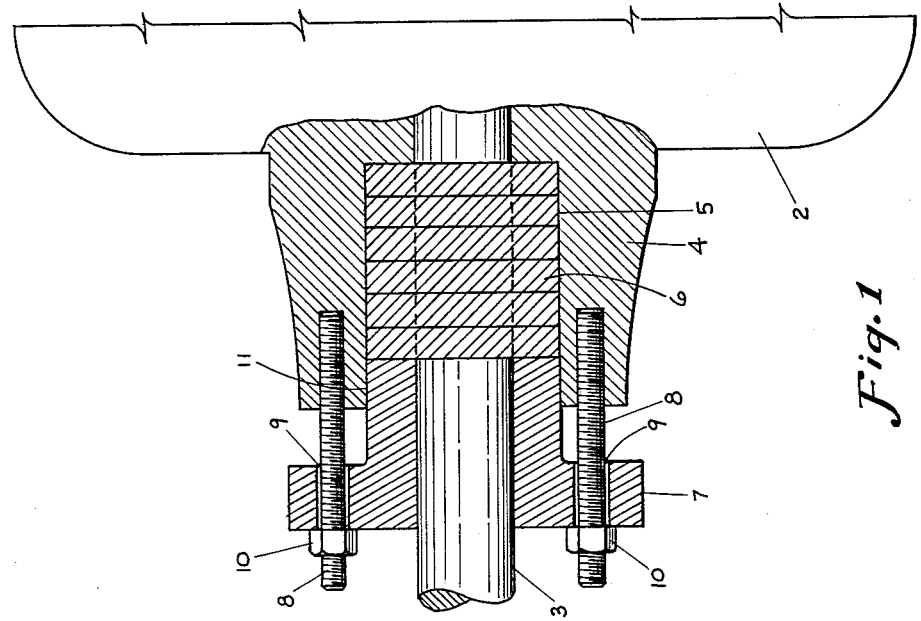
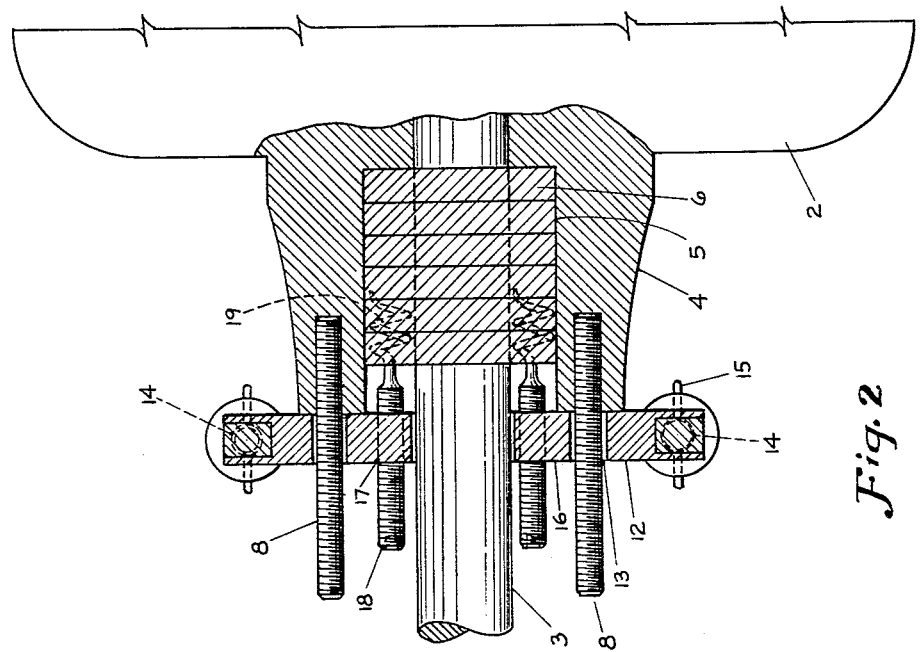

Sept. 22, 1964  M. H. SHAUB  3,149,514
PACKING EXTRACTOR

Filed May 25, 1960  2 Sheets-Sheet 2

3,149,514
PACKING EXTRACTOR
Melvin H. Shaub, 416 Fairway Drive, Manor Township,
Lancaster County, Pa.
Filed May 25, 1960, Ser. No. 31,703
2 Claims. (Cl. 81—8.1)

This invention relates to a tool and more particularly to a tool for extracting used packing from a stuffing box.

The operation of removing used packing from stuffing boxes surrounding rotatable shafts such as those encountered in pumps, valves, etc. has always been a difficult one due to the fact that the packing has been held under compression for a relatively long period of time during which it has become set and hard. It is essential that the packing be held under compression to seal around the shaft, and to accomplish this a packing gland is utilized which surrounds the shaft and by means of bolts and nuts is forced into tight engagement with the packing. In the prior art systems, when this packing is removed for replacement, the packing gland is removed from its position surrounding the shaft and a device similar to a pick or corkscrew is forced into the packing to pull it out. By reason of the fact that this extracting device engages the packing at only one point, the packing becomes cocked on the shaft and is usually mutilated to such an extent that it must be removed in small pieces requiring a considerable amount of time.

By the device of this invention, the packing can be easily removed by placing a yoke in position around the shaft in the same location ordinarily occupied by the packing gland. This yoke, however, does not have the projection for engagement with the packing but instead has a plurality of properly spaced packing extracting means. Each one of these extracting means is urged into the packing and when all are properly seated therein, the entire yoke is removed longitudinally along the shaft pulling the packing along.

It is an object of this invention to provide a device for engaging a used packing at a multiplicity of points on its surface so that it may be removed in one piece along the shaft in one easy operation.

In order that this invention may be more readily understood, it will be described in connection with the attached drawing, in which FIGURE 1 shows a packing in position held under compression by means of a packing gland;

FIGURE 2 is a similar view with the packing gland removed and the device of this invention in position for removal of the packing; and FIGURE 3 is an isometric view of the device of this invention.

Referring to FIGURE 1, there is shown a conventional pump having a housing 2 and a shaft 3. The housing has a hub 4 through which the shaft 3 passes. The hub 4 is provided with a stuffing box 5 of a diameter considerably larger than the diameter of the shaft 3 passing therethrough. The packing 6 surrounds the shaft 3 and fills the stuffing box 5 in the hub 4. The packing 6 is compressed in the stuffing box 5 so as to insure that the packing will engage the shaft 3 as well as the internal wall of the hub 4. This is accomplished by means of the packing gland 7 which is held in compressive relationship with the packing 6 by means of bolts 8 which are in threaded engagement with the hub 4 and pass through openings 9 in the packing gland 7. The nuts 10 force the axial projection 11 into engagement with the packing 6.

Referring now to FIGURE 2, it will be observed that the packing gland 7 has been removed and has been replaced by the yoke 12 which surrounds the shaft 3 and has openings 13 passing therethrough for the bolts 8.

The two halves of the yoke 12 are held in position on the shaft 3 and the bolts 8 by means of clamping bolts 14 passing through each end of the yoke. These clamping bolts are attached to one of the members of the yoke and hold the other member in alignment therewith by means of thumb screws 15. Instead of the openings 13 being round as shown in the drawing, they may be elongated slots to accommodate variations in spacing of the bolts 8. The distance between the shaft and the packing gland bolts 8 is not the same on all pumps and these slots make the device adaptable for any type of pump within reasonable variations.

When the yoke is in position surrounding the shaft 3, it is so designed that the shaft is surrounded by a ring portion 16. This ring portion is in axial alignment with the individual packing units surrounding the shaft. This ring portion is provided with a plurality of threaded holes 17. Each of these threaded holes 17 is provided with a screw 18 to the end of which is secured a corkscrew or auger type piercing member 19. The arrangement is such that when the yoke 12 is in position on the shaft 3, the screws 18 are parallel with the longitudinal axis of the shaft 3. The end of each of the screws 18 is provided with a recess for the reception of a turning instrument such as an Allen wrench.

In the particular embodiment shown in FIGURE 3, four holes 17 are provided but only two are shown with screws 18 positioned herein. It will be understood that any number of holes may be provided and any number of screws can be utilized depending on the nature of the packing to be removed. It will also be understood that in addition to the provision of the recess for the Allen wrench, the screws 18 may be provided with a conventional head for engagement by any other type of wrench or turning device.

In the operation of this device, the nuts 10 are removed and the packing gland is removed from its engagement with the packing. The yoke 12 is then put in position by placing one-half of the yoke on one side of the shaft 3 and the bolts 8, and placing the other half on the opposite side and clamping the two sections of the yoke together by means of the thumb screws 15 and the bolts 14. By reason of the alignment features provided by the shaft 3 and the bolts 8, the ring portion 16 will be in axial alignment with the packing. The nuts 10 are preferably put back in position to keep the yoke firm during the initial operation of turning the corkscrews into the packing. With the yoke in this position, the screws 18 are turned by means of a wrench so that they are screwed through the holes 17 in the yoke and the corkscrew end 19 worms its way into the packing. It is preferable to use sufficient screws 18 so as to engage the packing at several points equidistantly around the periphery of the packing. After the corkscrew has entered the packing, the entire yoke assembly is moved longitudinally along the shaft pulling the individual pieces of packing along. After the packing is moved beyond the confines of the hub 4, the screws 18 can be retracted and the packing can be taken off the shaft in the same manner that it was originally put on. In most instances it will be found that sufficient packing is provided that this operation will have to be repeated several times to remove all of the packing.

While this invention has been described in connection with a conventional pump packing, it will be obvious that the same tool and the same arrangement can be used for extracting the packing from valves such as water valves and steam valves, etc.

I claim:

1. In a tool of the type described to remove packing from a stuffing box surrounding a shaft, a yoke adapted to fit around the shaft in axial alignment with the stuffing box, means for securing said yoke to said stuffing box, an auger secured to said yoke and projecting from said yoke toward said packing in a direction parallel to said shaft, means for rotating and advancing said auger from said yoke to force it into said packing while said yoke is secured to said stuffing box.

2. In a tool of the type described to remove packing from a stuffing box surrounding a shaft, a yoke adapted to fit around the shaft in axial alignment with the stuffing box, means for securing said yoke to said stuffing box, a plurality of augers secured to said yoke and projecting from said yoke toward said packing in a direction parallel to said shaft, means for rotating and advancing said augers from said yoke to force them into said packing while said yoke is secured to said stuffing box.

References Cited in the file of this patent

UNITED STATES PATENTS

| | | |
|---|---|---|
| 665,073 | Doyle et al. | Jan. 1, 1901 |
| 974,583 | Meier et al. | Nov. 1, 1910 |
| 1,195,220 | Hendren | Aug. 22, 1916 |
| 2,650,419 | Barbisch | Sept. 1, 1953 |

FOREIGN PATENTS

| | | |
|---|---|---|
| 1,080,974 | France | June 2, 1954 |